(12) United States Patent
Suzuki et al.

(10) Patent No.: US 7,493,696 B2
(45) Date of Patent: *Feb. 24, 2009

(54) BUSH CUTTING MACHINE

(75) Inventors: Toshiyuki Suzuki, Tokyo (JP); Kenichi Yoshida, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/382,352

(22) Filed: May 9, 2006

(65) Prior Publication Data

US 2006/0191144 A1    Aug. 31, 2006

Related U.S. Application Data

(63) Continuation-in-part of application No. 11/249,385, filed on Oct. 14, 2005.

(30) Foreign Application Priority Data

Oct. 15, 2004    (JP)    ............... 2004-301988
May 9, 2005      (JP)    ............... 2005-136495

(51) Int. Cl.
    *B26B 7/00*    (2006.01)
(52) U.S. Cl. ...................... 30/276; 56/16.7; 56/12.7
(58) Field of Classification Search ............... 30/276; 56/16.7, 12.7
    See application file for complete search history.

(56) References Cited

U.S. PATENT DOCUMENTS

| 1,878,824 | A | * | 9/1932 | Dodge ................. 192/105 CD |
| 2,697,457 | A | * | 12/1954 | Lawrence ................. 30/388 |
| 3,430,343 | A | * | 3/1969 | Noto Hajime et al. ........ 30/276 |
| 4,006,528 | A | * | 2/1977 | Katsuya ................... 30/276 |
| 4,565,268 | A | * | 1/1986 | Yamamoto et al. ......... 477/171 |
| 4,586,322 | A | * | 5/1986 | Yokocho et al. ............ 30/276 |
| 4,655,032 | A | * | 4/1987 | Tanaka .................... 30/276 |
| 4,817,738 | A | * | 4/1989 | Dorner et al. ............. 30/276 |
| 4,841,929 | A | * | 6/1989 | Tuggle et al. ............. 30/276 |
| 4,876,797 | A | * | 10/1989 | Zapata .................... 30/388 |
| 4,976,093 | A | * | 12/1990 | Everts .................... 56/11.3 |
| 5,680,920 | A | * | 10/1997 | Jansson et al. ......... 192/105 BA |
| 5,774,993 | A | * | 7/1998 | Schlessmann .............. 30/276 |
| 6,105,258 | A | * | 8/2000 | Akaike ................... 30/276 |
| 6,213,677 | B1 | * | 4/2001 | Yamane et al. ............ 30/276 |
| 6,516,598 | B1 | * | 2/2003 | Notaras et al. ........... 56/16.7 |
| 6,550,145 | B2 | * | 4/2003 | Stoll et al. .............. 30/276 |

(Continued)

FOREIGN PATENT DOCUMENTS

JP    5-2620    1/1993

(Continued)

*Primary Examiner*—Maurina Rachuba
(74) *Attorney, Agent, or Firm*—Smith, Gambrell & Russell, LLP

(57) ABSTRACT

A bush cutting machine comprises a main body, a driven shaft rotatably supported in the main body and having two opposite ends, a cutter member operatively provided to one end of the main body, a power source operatively connected to the other end of the main body for generating a drive power to be transmitted to the cutter member through the driven shaft, and joint member for detachably and selectively connecting the main body and the power source. The power source is selective from an engine and an electric motor.

21 Claims, 11 Drawing Sheets

U.S. PATENT DOCUMENTS

2002/0160873 A1* 10/2002 Weisz .............................. 475/5
2005/0064973 A1* 3/2005 Schroeder et al. ........... 474/174

FOREIGN PATENT DOCUMENTS

| JP | 10056845 | 3/1998 |
| JP | 2004-8054 | 1/2004 |
| JP | 2006288296 | 10/2006 |

* cited by examiner

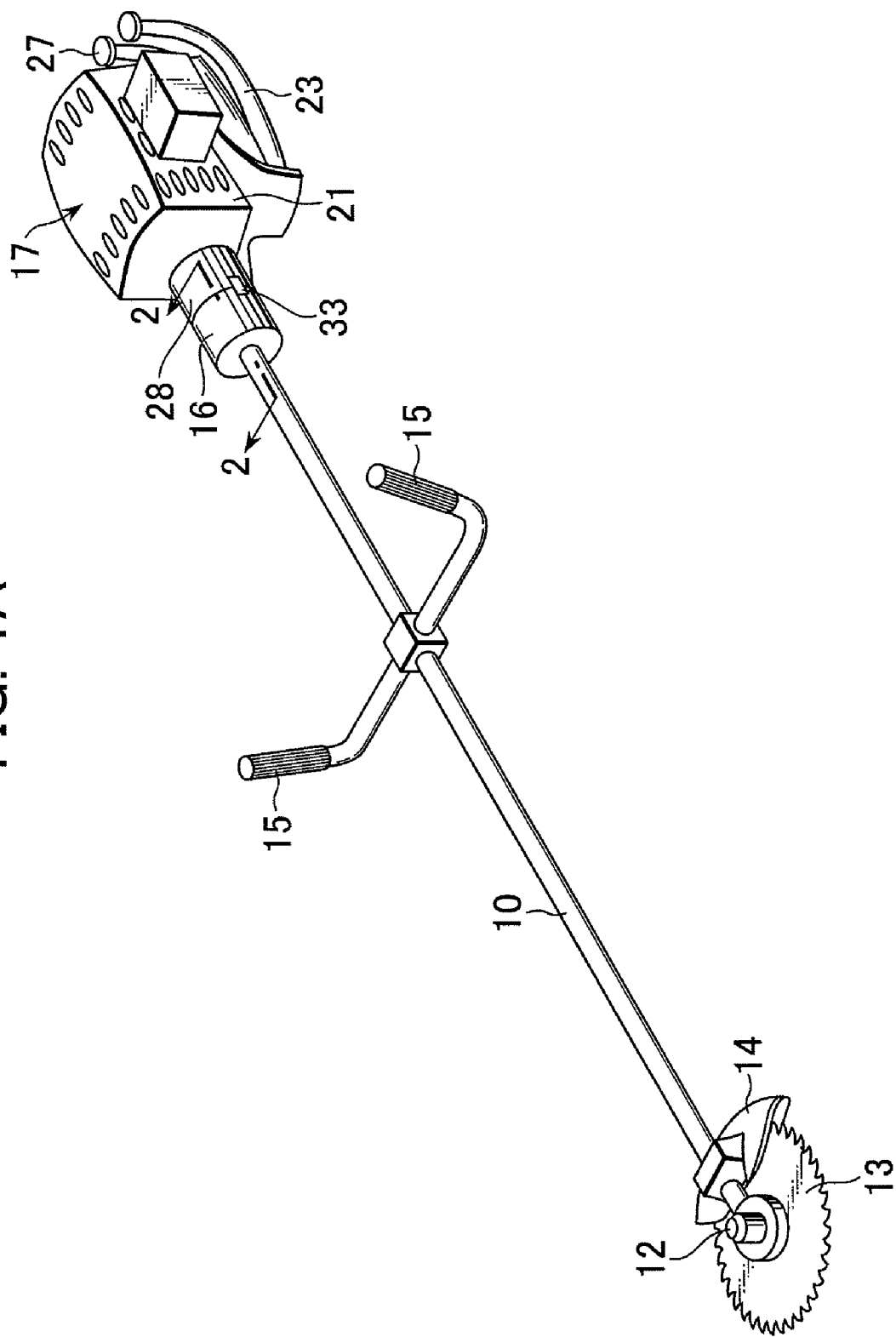

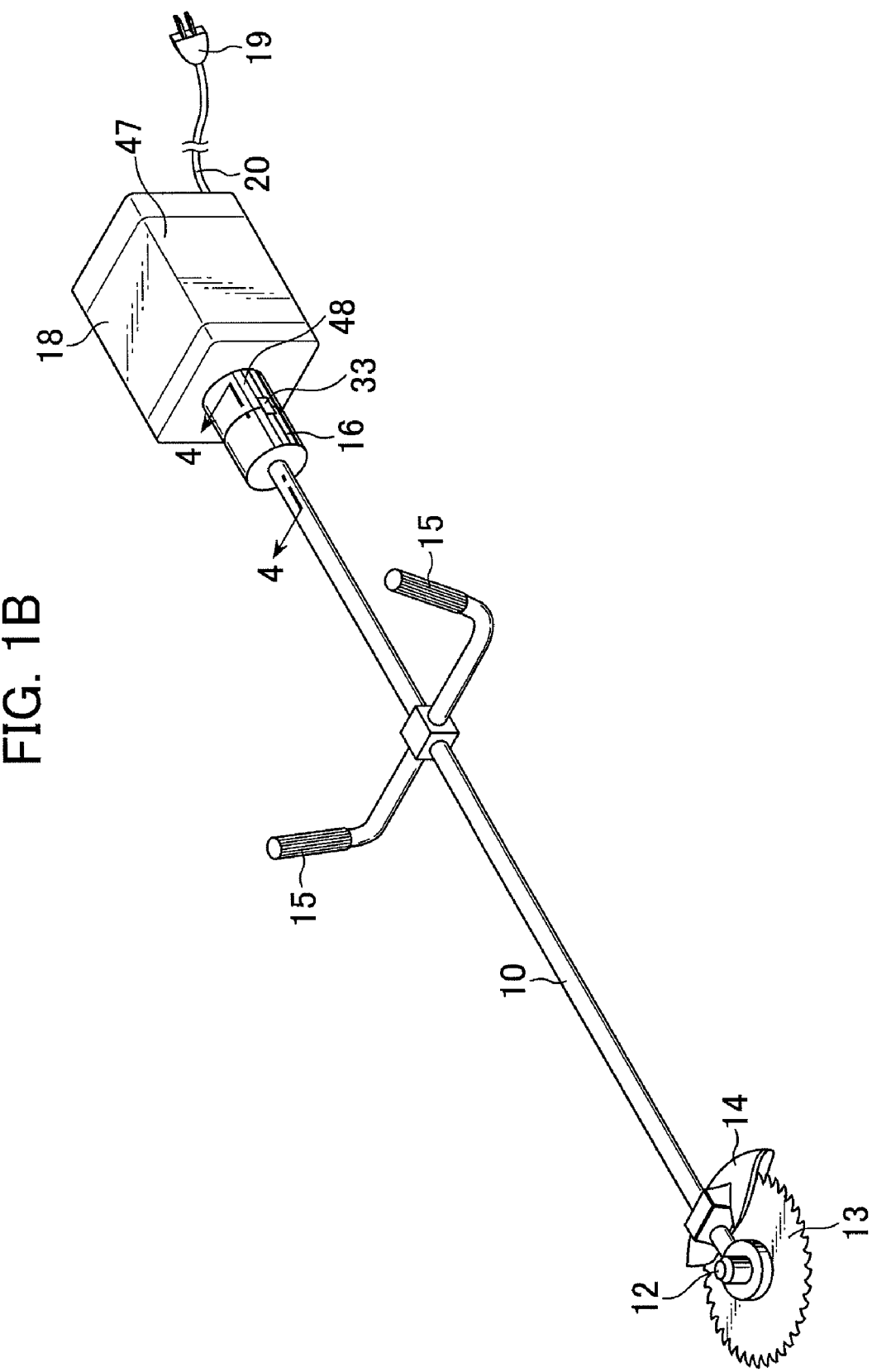

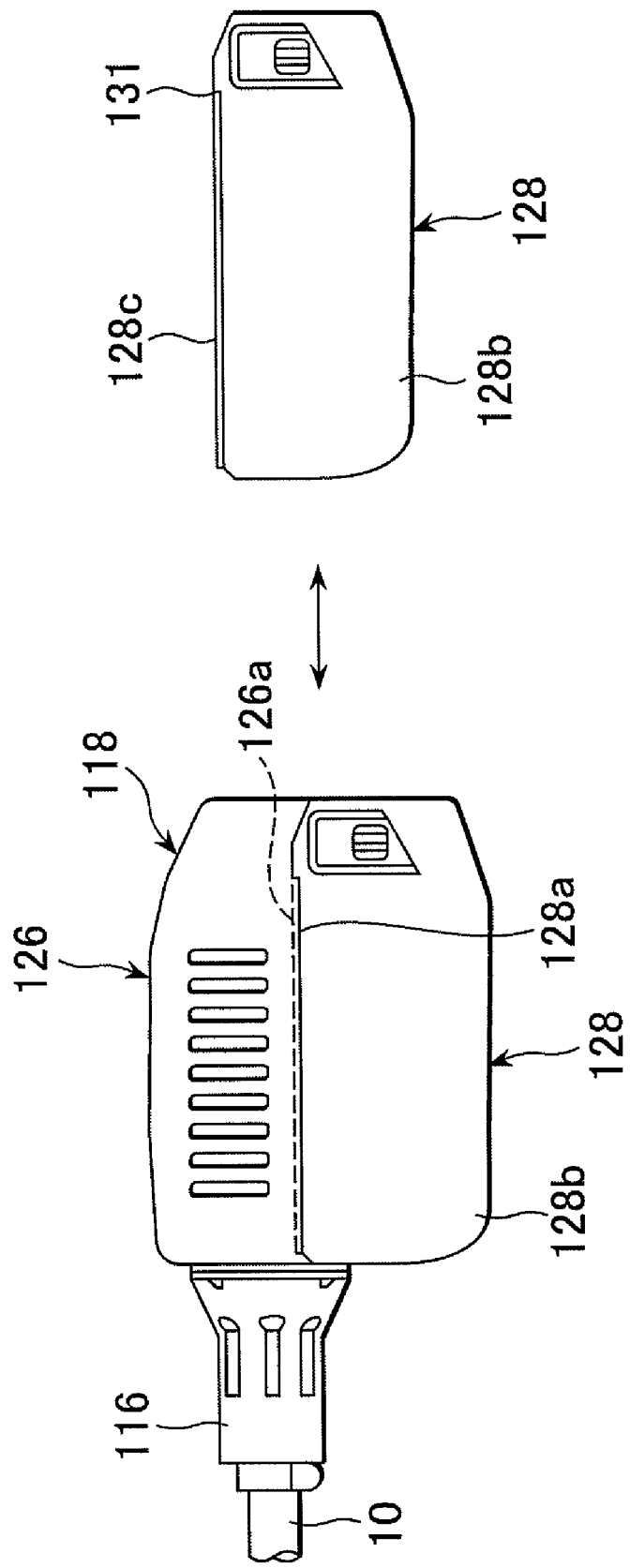

BUSH CUTTING MACHINE

CROSS REFERENCE TO RELATED APPLICATIONS

This application is a continuation in-part of U.S. Ser. No. 11/249,385 filed on Oct. 14, 2005.

The disclosure of Japanese Application No. 2004-301988 filed on Oct. 15, 2004, and Japanese Application No. 2005-136495 filed on May 9, 2005 including the specification, drawing and abstract are incorporated herein by references in its entirety.

FIELD OF THE INVENTION

This present invention is related to a bush cutting machine, preferably the bush cutting machine having a structure to be selectively attached one of an engine and an electric motor as a power source.

BACKGROUND OF THE INVENTION

A bush cutting machine, also referred to as a weed or grass cutter, is used to cut weed or, for example, a footpath in the fields, forest bottom weed of the forest or pasture grass. There are two types of the bush cutting machine. One is an arm coupling type and the other is a direct acting type. As for the arm coupling type, a cutter is attached to one end of an operation arm. A power source is attached to the other end of the operation arm. On the other hands, as for the direct acting type, a cutter is directly attached to an axis of a power source. These bush cutting machines use either an engine or an electric motor as the power source.

An example of a direct acting types bush cutting machine is seen in Japanese Utility Model Laid-Open No. 5-260, as the bush cutting machine which uses the electric motor as the power source, the direct acting type bush cutting machine, where an electric motor is attached to a tip of the operation arm, and a cutter is directly attached to a shaft of the electric motor, is mainly used.

As the bush cutting machine which uses the engine as the power source, the arm coupling type bush cutting machine, where a cutter is attached to one end of the operation arm and the engine is attached to the other end of the operation arm, is mainly used. An example of an arm coupling type bush cutting machine is seen in Japanese Patent Laid-Open No. 2004-8054.

Further, examples of the arm coupling type bush cutting machine include, but are not limited to, a carrying type bush cutting machine in which an engine is carried on the backpack mount, a shoulder type bush cutting machine in which a loop-like belt is attached to the operation arm for shoulder-carrying and a handle type bush cutting machine in which a handle, either looped or two-handed type, is attached on the operation arm for manipulation.

Furthermore, there are two types of the bush cutting machine which has the electric motor as the power source. One is an electric power source connecting type which the electric power is supplied from the commercial power supply outlet. The other is battery type. The electric power source connecting type can be used where a commercial power supply outlet is placed close to the working place. Otherwise, an electric generator is required instead of the power supply outlet. On the other hands, the battery type requires that the operator to switches out the battery or charges the battery because the battery capacity is limited so as to preclude operation of the bush cutting machine for a long time.

In contrast, the bush cutting machine which has the engine as the power source has the advantage that it can be used even if there is no power supply outlet close to the place of use. And furthermore, it can be used for a long time cutting work by supplying the fuel to the engine. However, engine noise at the time of work is louder than a motor drive.

Thus, the bush cutting machine which has the electric motor as the power source does not generate a loud noise. However, the place where the bush cutting machine is used is limited to around a house and the like and the operation for changing the battery is required.

In contrast, the bush cutting machine which has the engine as the power source can be used even if there is no power supply outlet close to the working place for cutting weeds and grass. However, when cutting work is carried out in the city, the noise problem may bother the neighbors.

For these reasons, the user has to select between the bush cutting machine having the engine power source and the bush cutting machine having the electric motor power source according to the working environment.

SUMMARY OF THE INVENTION

The present invention is directed at alleviating one or more of the problems discussed above. A preferred embodiment of the invention includes a bush cutting machine comprising a main body; a driven shaft rotatably supported in the main body and having two opposite ends; a cutter member operatively provided to one end of the main body; a power source operatively connected to the other end of the main body for generating a drive power to be transmitted to the cutter member through the driven shaft, and a joint member for detachably and selectively connecting the main body and the power source, wherein the power source is selective from an engine and an electric motor.

Accordingly, both of the engine as the power source and the electric motor as the power source are selectively attached to the main body by respective joint structure so that a user can select one of the power sources based on the working circumstance.

The handle is preferably provided on the midst of the main body for an user to carry the bush cutter during cutting.

The joint member preferably includes a main body side joint incorporating a centrifugal clutch therein and a power source side joint connected to the housing of the power source.

The engine is accompanied by a centrifugal clutch placed in the housing of the engine.

For a preferable embodiment, the joint member preferably includes a first clutch member provided to the driven shaft, a second clutch member provided to a drive shaft of the power source, wherein the first and second clutch member forms a centrifugal clutch for transmitting a drive power to the driven shaft.

An additional embodiment of the present invention features a bush cutting machine comprising; an operation arm; a driven shaft rotatably supported inside the operation arm and having two opposite ends; a cutter operatively connected to one end of the driven shaft; a power source operatively connected to the other end of the driven shaft for generating a drive power to be transmitted to the cutter through the driven shaft, the power source being selective from an engine and an electric motor; and an arm side joint provided on the end of the operation arm; a power source side joint provided on a housing of the power source and detachably and selectively connected to the arm side joint; and a centrifugal clutch incorporated in the arm side joint and having a first member connected to the driven shaft, a second member detachably and selectively connected to the power source and a third member provided to engage the first member and the second member according to the centrifugal force applied thereto.

Preferably, the first member comprises a clutch drum, the second member comprises a clutch input shaft rotatably supported by the arm side joint and the third member comprises a rotor plate fixed to the clutch input shaft, a clutch shoe rotatably supported on the rotor plate and an extension spring applying the spring force to the clutch shoe so as to leave the clutch shoe from the clutch drum, whereby when the rotational speed of the clutch input shaft increases, the centrifugal force moves the clutch shoe toward the clutch drum against the spring force of the extension spring to have the centrifugal clutch engaged.

The bush cutting machine further comprises a fasten member for fastening the arm side joint and the power source side joint.

An embodiment of the present invention also includes a bush cutting machine comprising; an operation arm; a driven shaft rotatably supported inside the operation arm and having two opposite ends; a cutter operatively provided to one end of the operation arm; a power source operatively connected to the other end of the operation arm for generating a drive power to be transmitted to the cutter through the driven shaft, wherein the power source is selective from an engine and an electric motor; and a first clutch provided to other end of the driven shaft; a second clutch provided to the power source; a centrifugal clutch formed by the first and second clutches for transmitting the drive power to the driven shaft from the power source.

Thus, in a preferred embodiment, the first clutch member includes a clutch drum, the second clutch member includes a clutch shoe which is forced on an inner surface of the clutch drum by a centrifugal force.

The second clutch member includes a rotor plate fixed to an output shaft of the power source, a clutch shoe rotatably supported on the rotor plate and an extension spring applying the spring force to the clutch shoe so as to leave the clutch shoe from the clutch drum, whereby when the rotational speed of the clutch input shaft increases, the centrifugal force moves the clutch shoe toward the clutch drum against the spring force of the extension spring to have the centrifugal clutch engaged.

BRIEF DESCRIPTION OF THE DRAWINGS

FIG. 1A is a perspective view of a bush cutting machine according to a first embodiment of the present invention, in which an engine is attached to a main body as the power source.

FIG. 1B is a perspective view of a bush cutting machine according to the first embodiment of the present invention, in which an electric motor is attached to a main body as the power source.

FIG. 11 is an explanatory figure of installing procedure of battery to the electric motor shown in FIG. 10A.

DETAILED DESCRIPTION OF THE PREFERRED EMBODIMENTS

Preferred embodiments of the present invention are explained with figures. However, the scope of the invention is not intended to be limited by the illustrated embodiments of the figures.

FIGS. 1-4 show a first embodiment where the bush cutting machine has a structure to be selectively attached from the option of an engine and an electric motor as a power source.

Figure 2:
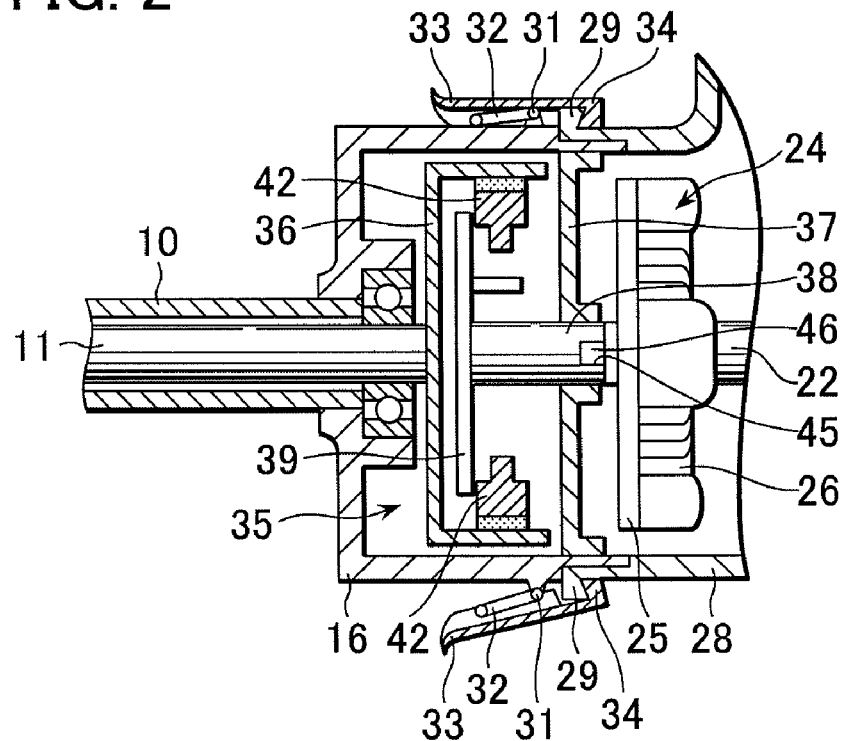
FIG. 2 is an expanded cross-sectional view of FIG. 1A along the line 2-2.

The bush cutting machine shown in FIGS. 1A and 1B, which is the arm coupling type, comprises an operation arm 10 as a main body, a driven shaft 11 rotatably provided inside the operation arm 10 as shown in FIG. 2, a discoid metal cutter 13 installed on the driven shaft 11 at one end of the operation arm 10, an arm side joint 16 provided at the other end of the operation arm 10 with a large diameter than the operation arm 10 and either one of an engine 17 and an electric motor 18 selectively installed on the operation arm 10 through the joint 16. The operation arm 10 is formed of a hollow shaft. A holder 12 is attached to the one end of the operation arm 10. The metal cutter 13 has a plurality of saw-edged cutting tooth on its outer peripheral and is rotatably attached to the holder 12. The cutter 13 is connected to the end of the driven shaft 11 through a pair of bevel gears (not shown). The operation arm 10 has a cover 14 at its end to partially cover the cutter 13 so that the safety of work is secured. In addition, the cutter 13 may be replaced by alternate cutting means as in a cutter composed of one or more strings or strips extending radially from the center of rotation.

Two handles 15 are installed on a center part of the operation arm 10 so that the user can work on cutting grass by gripping the handles 15 with both hands. In place of the two-handed type handles 15 as shown in FIGS. 1A and 1B, a looped type handle may be used. Furthermore, a loop-like belt can be attached to the operation arm 10 for shoulder carrying the bush cutting machine.

The arm side joint 16, as a main body side joint, is provided on the opposite end of the cutter supporting end of the operation arm 10. The arm side joint 16 is preferably constructed by a cylindrical member of a large diameter than the operation arm 10. Either an engine 17 as shown in FIG. 1A or an electric motor 18 as shown in FIG. 1B is selectively (optionally) attached to the operation arm 10 through the arm side joint 16. The electric motor 18 has a power supply cable 20 with an electrical plug 19 which is inserted into the power supply outlet so as to supply electric power to the electric motor 18. Alternatively, a battery may be used as the power supply instead of the commercial power supply. By using the battery as the power supply, the bush cutting machine can be quietly driven by the motor in the outdoors with no power supply outlet.

The engine 17 is, for example, a single cylinder 4-stroke cycles engine. Inside of an engine cover 21, there are engine components such as a crankcase for rotatably supporting an engine output shaft 22 connected to a crankshaft shown in FIG. 2, and a cylinder in which a piston travels reciprocally is provided in the crankcase. Also, the engine 17 is equipped with a fuel tank 23 storing gasoline fuel. A cooling fan 24 generating engine cooling air is installed on the output shaft 22. The cooling fan 24 comprises a disk 25 connected to the output shaft 22 and a plurality of fan blades 26 fixed to the disk 25. Further, the illustrated engine 17 is equipped with a recoil starter for turning the output shaft 22 manually so that the engine 17 can be started by pulling a recoil knob 27 as shown in FIG. 1A.

An engine side joint 28, as a power source side joint, which can be coupled to and removed from the arm side joint 16, is provided on the engine cover 21. As shown in FIG. 2, this engine side joint 28 is partly fitted to the arm side joint 16. On the outer surface of the arm side joint 16, one end of a link 32 is swingably connected to a supporting point 31 of the outer surface of the arm side joint 16. The other end of the link 32 is swingably connected to a middle portion of a tightening lever 33. A detent projection 34 is provided at one end of the tightening lever 33 as a fastener member, so as to be selectively engaged with a projection 29 formed on the engine side joint 28. When the tightening lever 33 is pushed down to the arm side joint 16 after engaging the detent projection 34 with the projection 29, the tightening lever 33 tightly connects the arm side joint 16 and the engine side joint 28.

In addition, regarding the fastener member, it is not limited to the structure shown in FIG. 2. For example, bolts can be used to couple the arm side joint 16 and engine side joint 28 as explained in details in the third embodiment. Furthermore, a connecting sleeve is rotatably attached to the outside of the arm side joint 16, and the engine side joint 28 may be provided with a male screw to be coupled with a female screw which is provided inside the connect sleeve so that the operation arm 10 and the engine 17 can be fastened by screws.

Figure 3:
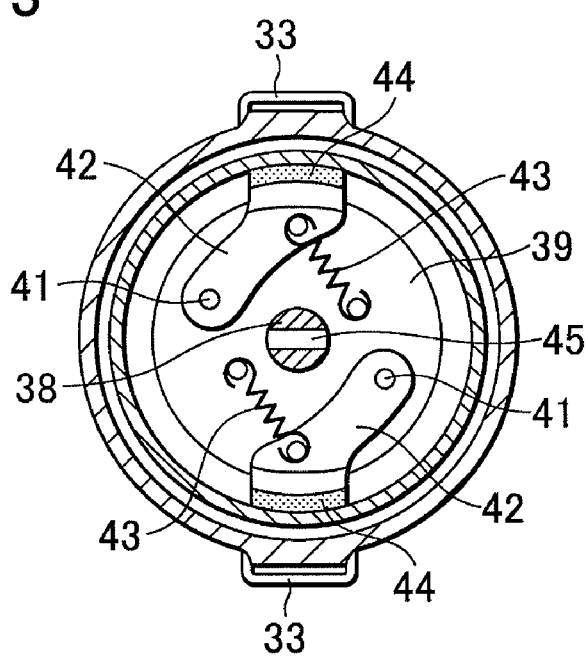
FIG. 3 is a cross-sectional view of FIG. 2.

The arm side joint 16, which is formed by a cylindrical member, incorporates a centrifugal clutch 35 therein. This centrifugal clutch 35 comprises a clutch drum 36 fixed to the driven shaft 11 and a clutch input shaft 38 rotatably supported by a supporting wall 37. As shown in FIG. 3, a plurality of clutch shoes 42 are rotatably supported by a pin 41 on a rotor plate 39 fixed to the clutch input shaft 38. Spring force of an extension spring 43 is applied to each clutch shoe 42 so as to leave a frictional contact region 44 of the clutch shoe 42 from an inner surface of the clutch drum 36. Thus, when the rotational speed of the clutch input shaft 38 increases, the centrifugal force applied to the clutch shoe 42 moves the clutch shoe 42 toward the inner surface of the clutch drum 36 against the spring force of the extension springs 43, whereby the clutch input shaft 38 and the driven shaft 11 are connected through the clutch shoes 42. On the other hand, when the engine 17 is started by pulling the recoil knob 27, the centrifugal clutch 35 has not been engaged so that the recoil knob 27 can be pulled without a strong resistance being applied.

An engaging groove 45 is provided across the end of the clutch input shaft 38 of the centrifugal clutch 35 in a diametrical direction. An engaging projection 46 to be engaged with the engaging groove 45 is provided on the side of the disk 25 of the cooling fan 24 opposite to the fan blades 26. Thus, the driven shaft 11 and the engine output shaft 22 are connected through the centrifugal clutch 35 with the engagement of the engaging groove 45 and the engaging projection 46. In addition, it is also suggested that the engaging groove and the engaging projection can be provided vice versa.

As shown in FIG. 2, in order to install engine 17 to the operation arm 10, the engaging groove 45 and engaging projection 46 are engaged each other at the beginning, then the engine side joint 28 of the engine cover 21 is fitted to the arm side joint 16 of the operation arm 10, and finally the tightening lever 33 as the fastening member is manipulated to tighten the joints 16 and 28. According to this structure, the bush cutting machine drives the cutter 13 by the driving force of the engine 17 so that the desired material for cutting (e.g. grass) can be cut or mowed.

Figure 4:
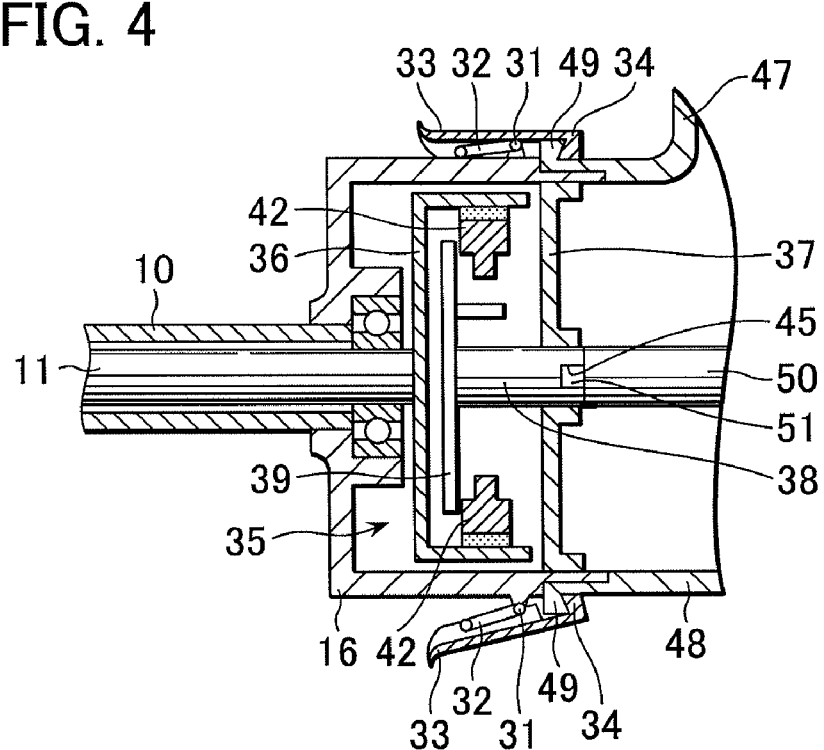
FIG. 4 is an expanded cross-sectional view of FIG. 1B along line 4-4.

As shown in FIG. 1B, the electric motor 18 has motor cover 47 shown in FIG. 4, a cylindrical motor side joint 48, as the power source side joint, which is the same size as the engine side joint 28 is attached to this motor cover 47. The motor side joint 48 has a projection 49 with which a detent projection 34 of a tightening lever 33 installed in the arm side joint 16 is adapted to engage. An engaging projection 51 is provided on the end of a motor output shaft 50 so as to engage with the engaging groove 45 provided across the end of the clutch input shaft 38. According to this structure, the driven shaft 11 and the motor output shaft 50 are connected through the centrifugal clutch 35 with the engagement of the engaging groove 45 and the engaging projection 46.

Thus, as shown in FIG. 4, in order to install the electric motor 18 to the operation arm 10, the engaging groove 45 and the engaging projection 51 are engaged each other at the beginning, then the motor side joint 48 of the motor cover 47 is fitted to the arm side joint 16 of the operation arm 10, and finally the tightening lever 33 as the fastening member is manipulated to tighten the joints 16 and 48. According to this structure, the bush cutting machine drives the cutter 13 by the driving power of the electric motor 18 so that, for example, grass can be cut or mowed.

According to the bush cutting machine as the first embodiment, the user can selectively install either one of the engine 17 and the electric motor 18 on the operation arm 10 with the preparation of both the engine 17 and the electric motor 18 as attachments to the bush cutting machine. That is, the bush cutting machine can be used with either an engine drive type or a motor drive type on the basis of the working environment. For example, the engine 17 can be used as the power source in the working environment where there is no power supply outlet or at the place where silence is not required. On the other hands, the electric motor 18 can be used as the power source in the working environment where there is a power supply outlet.

Figure 5:
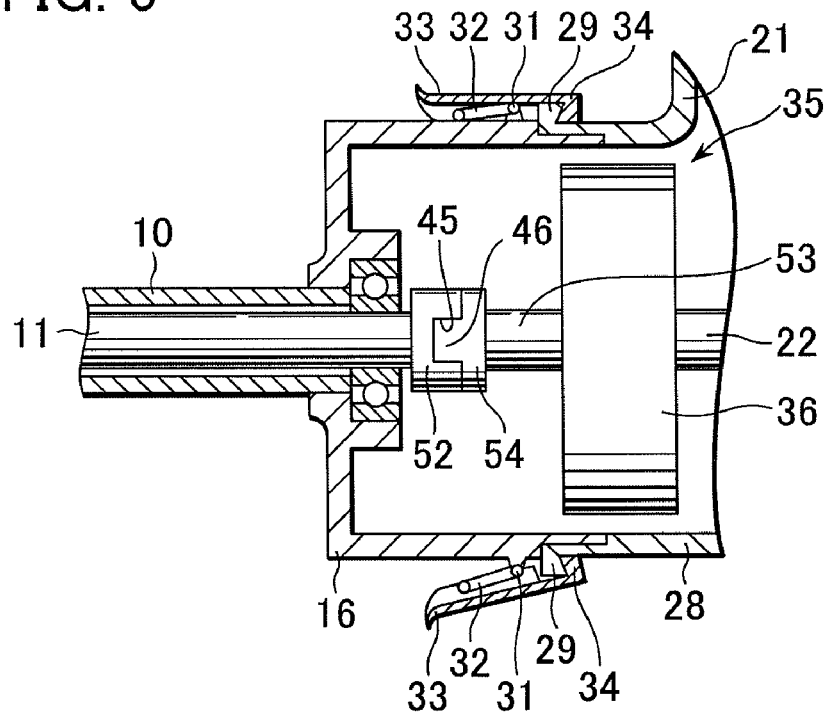
FIG. 5 is a cross-sectional view of the bush cutting machine according to the second embodiment of the present invention.

FIG. 5 is a sectional view of a second embodiment of the bush cutting machine of the present invention. This view shows the same portion as FIG. 2. In this bush cutting machine, the centrifugal clutch 35 is incorporated inside the engine side joint 28. A large-diameter flange 52 having the engaging groove 45 is provided on the end of the driven shaft 11. And, a large-diameter flange 54 having the engaging projection 46 is provided on the end of a clutch output shaft 53 secured to the clutch drum 36 of the centrifugal clutch 35. The engaging projection 46 is adopted to couple with the engaging groove 45.

In the second embodiment, the motor output shaft 50 of the electric motor 18 is coupled with a large diameter flange 52 of the driven shaft 11 directly. Furthermore, the centrifugal clutch 35 may be installed elsewhere along the transmission line of the operation arm 10 or may be installed inside the engine 17.

FIGS. 6-13 show a third embodiment where the centrifugal clutch is formed by a first clutch member provided to the driven shaft inside the operating arm, and a second clutch member provided to the drive shaft of the power source.

As the power source, the engine 117 and the electric motor 118 are shown in FIG. 9-10.

Figure 9A:
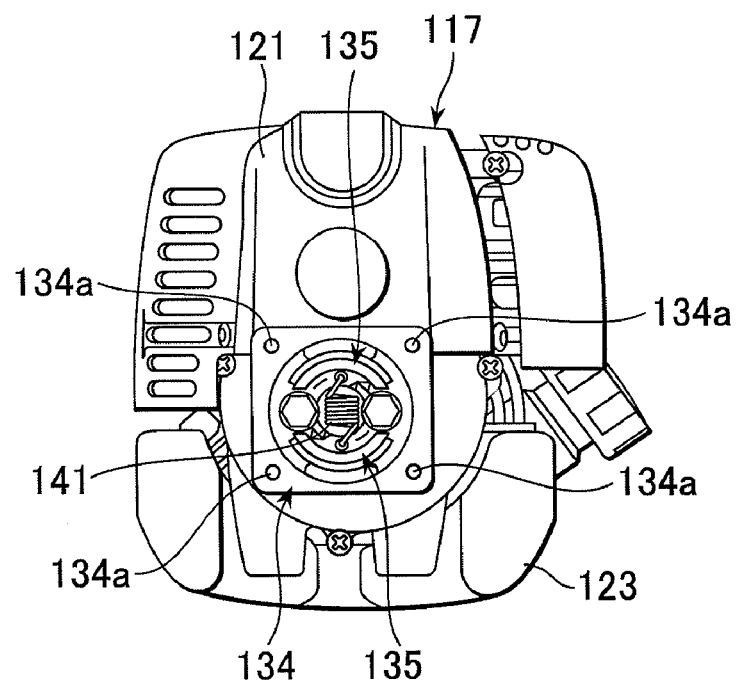
FIG. 9A is a front-view of the engine shown in FIG. 6A.
Figure 9B:
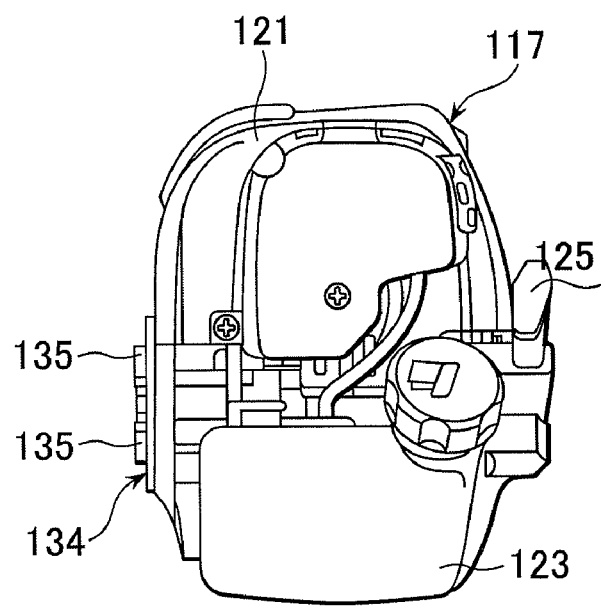
FIG. 9B is a side view of the engine shown in FIG. 9A.

As shown in FIGS. 9A and 9B, the engine 117 is a single cylinder 4-stroke cycles engine. Inside of an engine cover 121, there are engine components such as a crankcase for rotatably supporting an engine output shaft 122 connected to a crankshaft shown in FIG. 7, and a cylinder in which a piston travels reciprocally. Also, the engine 117 is equipped with a fuel tank 123 storing gasoline fuel. A cooling fan 124 generating engine cooling air is installed on the output shaft 122. Further, the engine 117 is equipped with a recoil starter for turning the output shaft 122 manually so as to start the engine 117 by pulling a recoil knob 125 shown in FIG. 9B. The same engine as the first embodiment is used as the engine 117.

Figure 8:
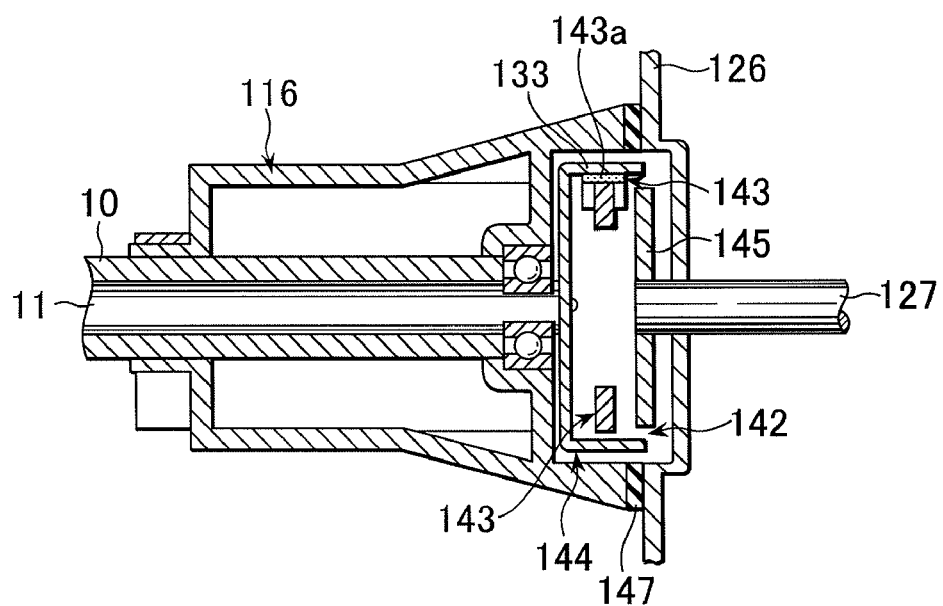
FIG. 8 is a cross-sectional view of the bush cutting machine shown in FIG. 6B.
Figure 10A:
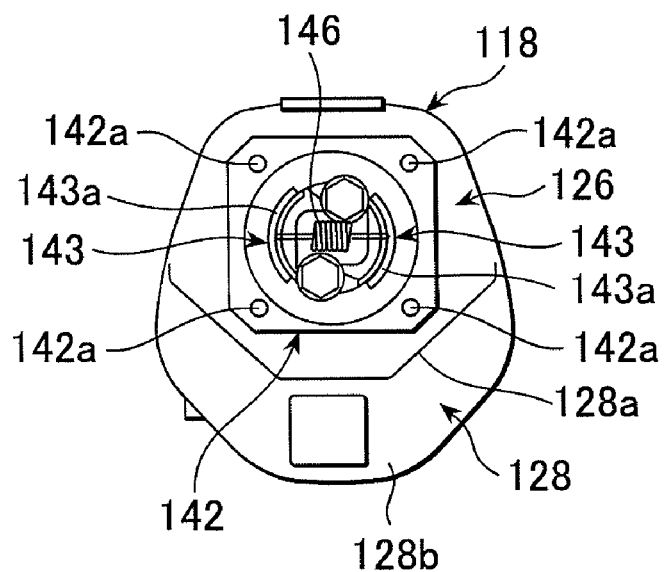
FIG. 10A is a front-view of the electric motor.
Figure 10B:
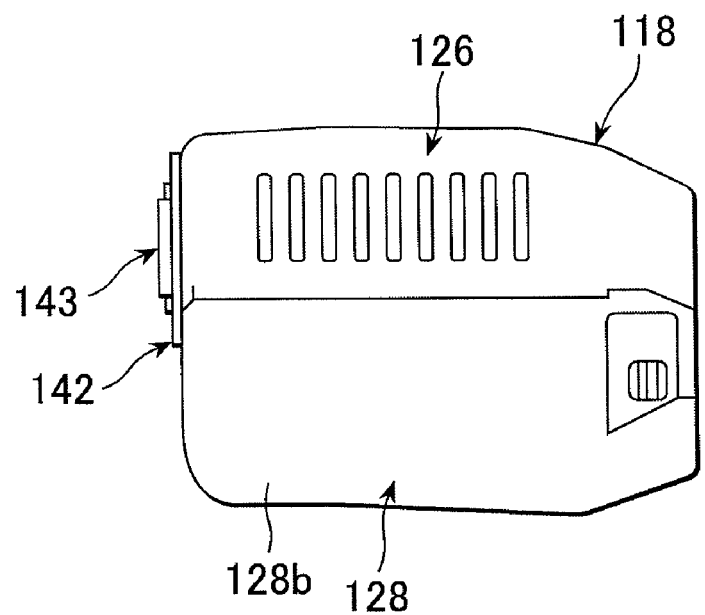
FIG. 10B is a side view of the electric motor shown in FIG. 10A.

The electric motor 118 is shown in FIGS. 10A and 10B. The electric motor 118 has a motor case 126 which shape is approximately hexagonal prism. The motor case 126 rotatably supports a motor output shaft 127 as shown in FIG. 8. Inside of the motor case 126, a plurality of motor components are arranged. Furthermore, a battery 128 is mounted to an outer surface of the electric motor 118. The battery 128 is rechargeable battery such as lithium ion battery. The electric motor is driven by the electric power of the battery 128. As shown in FIG. 10A, the battery 128 is formed as generally V-shape cross section perpendicular to the output shaft 127, and is installed to the motor case 126 along the line of an outer surface of the motor case 126. An inner side surface of the battery 128 is opposed to the three bottom surfaces of the motor case 126. The outer side surface of the battery 128 is formed with continued to the outer surface of the motor case 126. As shown in FIG. 6, each of distal portions of the V-shape of the battery 128 which is the boundary portion between inner side surface and outer side surface has engagement groove 128a extending in the axial direction. A pair of rail portions 126a which is to be engaged with these engagement grooves 128a are formed in the lower end of both side surfaces. The engagement groove 128a is formed to extend in parallel with the output shaft 127.

The battery 128 is installed to the electric motor 118 by engaging the engagement groove 128a with the rail portion 126a, and sliding the battery 128 against the electric motor 118 toward axial direction until the stopper 131 is abutted to the edge portion of the rail portion 126a. By installing the battery to the electric motor 118, a driving current flows to the electric motor 118 through a feed terminal of the battery 128 (not shown in figure) connected to the supply terminal of the electric motor 118 (not shown in figure). Furthermore, the battery 128 can be removed from the electric motor 118 by sliding the battery 128 backward direction against the installing direction. As described above, the battery 128 is removably and slidably installed to the outer surface of the electric motor 118. For charging the battery 128, the battery 128 can be removed and is charged by a charger (not shown in figure). For this structure, the battery 128 is easily charged. Furthermore, the battery 128 is installed to the outer surface of the electric motor 118 by sliding in the axially direction. A center of gravity position of the electric motor 118 is not changed in the axially direction against the driven shaft even if the battery is installed. For this structure, the operationability of the bush cutting machine can be improved. Moreover, the battery 128 is formed as generally V-shape in the cross section perpendicular to the output shaft 127 along the line of an outer surface of the motor case 126. The center of gravity position of the electric motor 118 and the center of gravity position of the battery 128 can be moved toward diametrical direction. For this structure, the operationability of the bush cutting machine can be improved.

Figure 7:
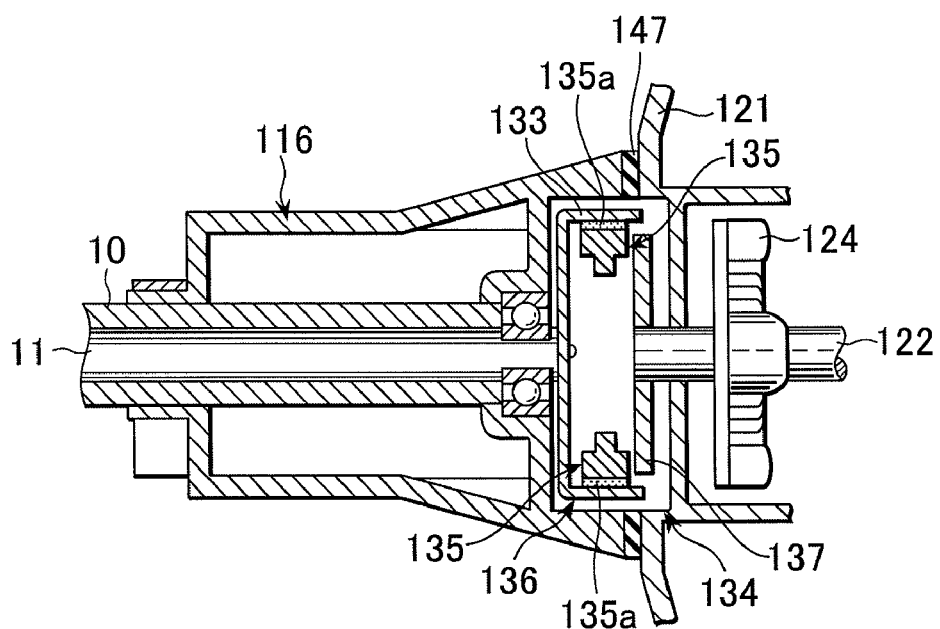
FIG. 7 is a cross-sectional view of the bush cutting machine shown in FIG. 6A.
Figure 12A:
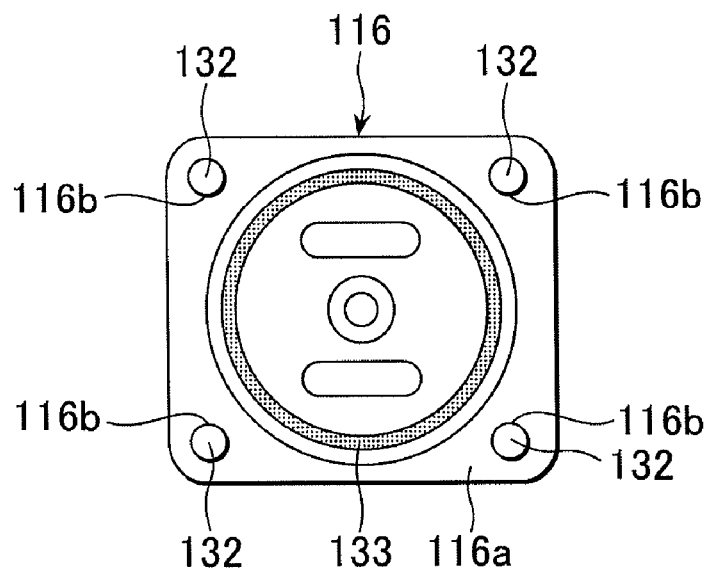
FIG. 12A is a front-view of a driven side joint.
Figure 12B:
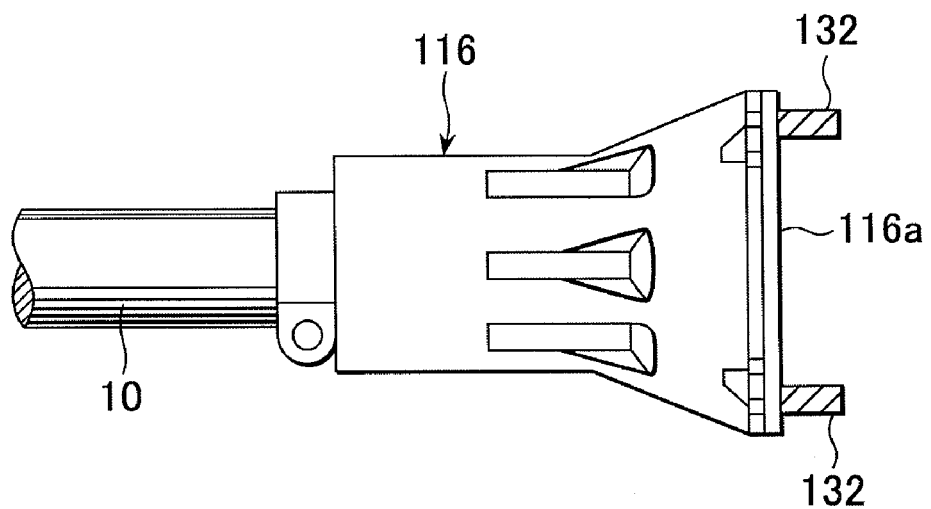
FIG. 12B is a side view of the driven side joint shown in FIG. 12A.
Figure 13:
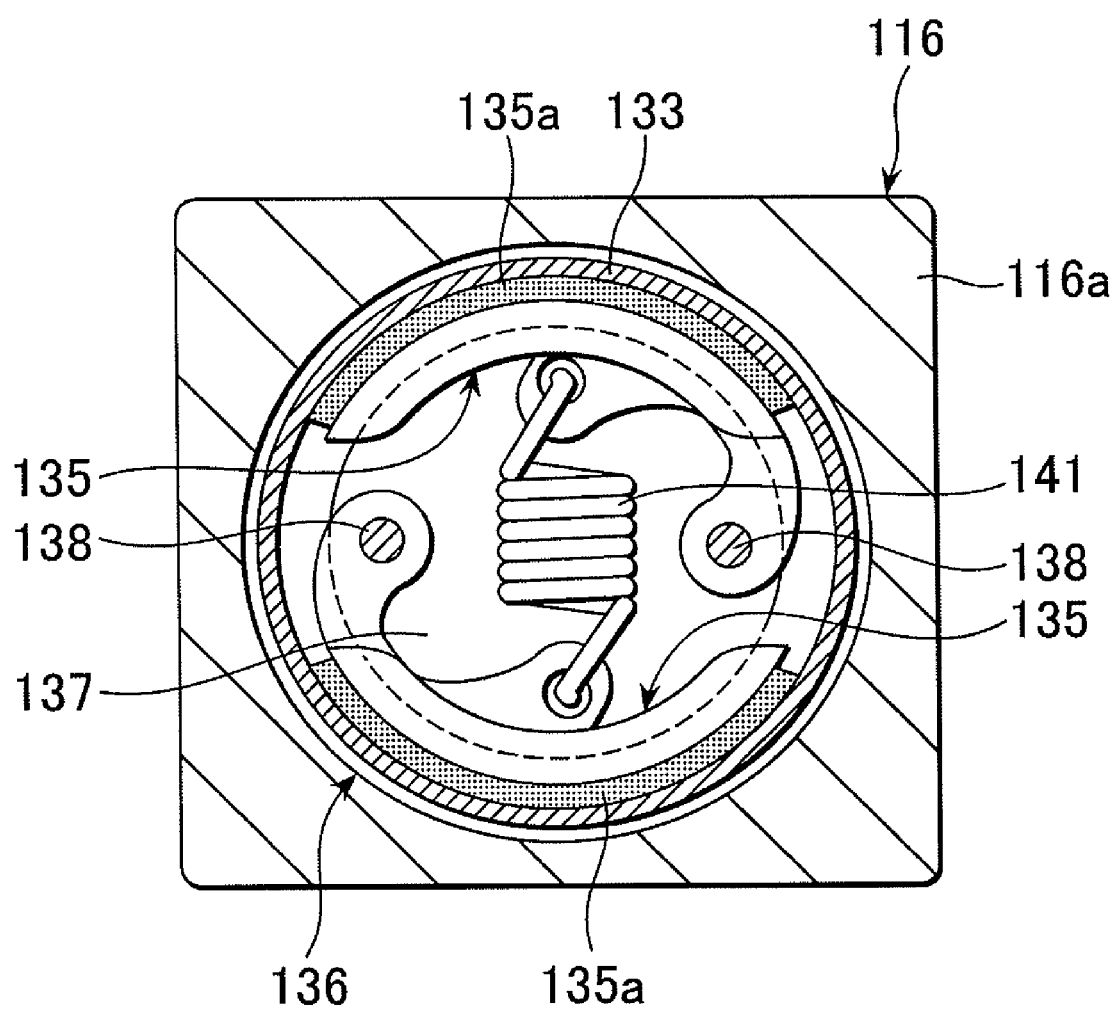
FIG. 13 is an explanatory figure of a centrifugal clutch shown in FIG. 2.

FIG. 12A is a frontal view of the arm side joint. FIG. 12B is a side view of the arm side joint shown in FIG. 12A. As shown in FIG. 12A and FIG. 12B the arm side joint 116 is formed as a cup shape of larger diameter than the operation arm 10, and is fixed to a rear end of the operational arm 10. The arm side joint 116 has square shape flange portion 116a in the open end. There are mounting holes 116b in each corner of flange portion 116a. A bolt 132 as a fastening member can be inserted to each of mounting holes 16b. Furthermore, as shown in FIG. 12A, a clutch drum 133 as a clutch member of the arm side clutch member is incorporated inside the arm side joint 116. As shown in FIG. 7 this clutch drum 133 is fixed to the driven shaft 11. The driven shaft 11 is rotated by the rotation of the clutch drum 133.

As shown in FIG. 9A, the engine cover 121 has an engine side joint 134 which has four screw holes 134a. The arm side joint 116 is coupled to the engine side joint 134 by tightening the bolt 132 fixed to the flange portion 116a into the screw hole 134a. Moreover, a pair of clutch shoes 135 as a drive side clutch member is provided in the end of the engine output shaft 122. These clutch shoes 135 are incorporated inside the engine side joint 134.

As shown in FIG. 7, in the condition that the arm side joint 116 is coupled to the engine side joint 134, a centrifugal clutch 136 is formed between the driven shaft 11 and the engine output shaft 122 by assembling these clutch shoes 135 to the clutch drum 133.

FIG. 8 is a cross sectional view of FIG. 7. The engine side joint 134 has a discal rotating plate 137 which is fixed to the engine output shaft 122. The clutch shoe 135 is swingablly installed to the rotating plate 137 by a pin 138. An extension spring 141 is provided between clutch shoes 135. Each of clutch shoes 135 is applied spring force of the extension spring 141 so as to leave a frictional contact region 135a from the inner surface of the clutch drum 133. Thus, when the rotational speed of the engine rises, the centrifugal force applied to the clutch shoe 135 moves the clutch shoe 135 toward clutch drum 133 against the spring force of the extension spring 141, whereby the clutch shoe 135 is connected to the inner surface of the clutch drum 133. For this structure, the engine output shaft 122 is directly connected to the driven shaft through the centrifugal clutch 36. When the engine 117 is started by pulling the recoil knob 125, the centrifugal clutch 136 has not been engaged so that the recoil knob 125 can be pulled without a big resistance.

Figure 6A:
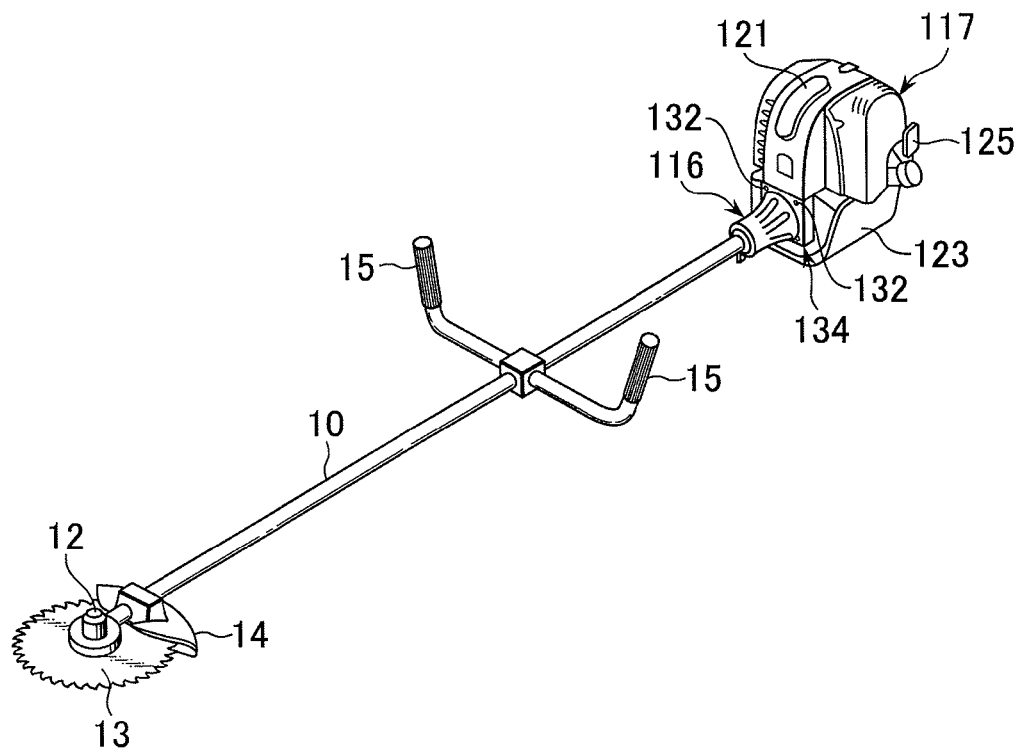
FIG. 6A is a perspective view to show the bush cutting machine according to a third embodiment of the present invention, in which an engine is attached to a main body as the power source.
Figure 6B:
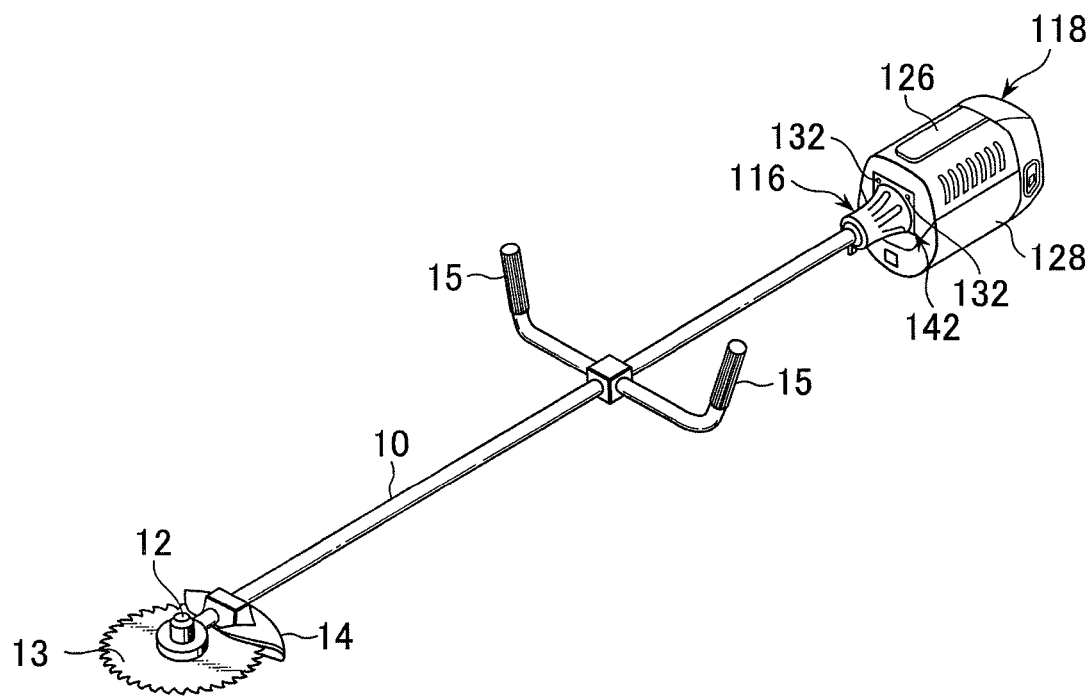
FIG. 6B is a perspective view to show the bush cutting machine according to the third embodiment of the present invention, in which an electric motor is attached to a main body as the power source.

Thus, by coupling the arm side joint 16 fixed to the operational arm 10 to the engine side joint 134, as shown in FIG. 6A, the engine 117 is attached to the operational arm 10 as the bush cutting machine body. Moreover, by coupling the arm side joint 116 to the engine side joint 134, the engine output shaft 122 is coupled to the driven shaft 11 through the centrifugal clutch 136 which includes the clutch drum 133 and the clutch shoe 135. That is, the bush cutting machine rotates the cutter to cut the grass based on the engine 117 as the power source.

As shown in FIG. 10A, the motor side joint 142 is provided on the motor case 26. The motor side joint 42 has four screw holes 142a. The arm side joint 116 is coupled to the motor side joint 142 by tightening the bolt 132 fixed to the flange portion 116a into the screw hole. Furthermore, a pair of clutch shoes 135 as a drive side clutch member are provided in the tip of the motor output shaft 122. These clutch shoes 43 are incorporated inside the motor side joint 142.

As shown in FIG. 8, when the arm side joint 116 is coupled to the motor side joint 142, a centrifugal clutch 144 is formed between the driven shaft 11 and the motor output shaft 127 by assembling these clutch shoe 135 to the clutch drum 133. The clutch shoe 143 provided on the motor side joint 142 is swingablly installed to the rotating plate 137 by a pin (not shown). Each of clutch shoes 143 is connected by an extension spring 146 (shown in FIG. 10A) to each other, with applied spring force of the extension spring 146 so as to leave a frictional contact region 143a from the inner surface of the clutch drum 133. Thus, when the rotational speed of the electric motor 118 rises, the centrifugal force applied to the clutch shoe 143 moves the clutch shoe 143 toward inner surface of the clutch drum 136 against the spring force of the extension spring 146, whereby the clutch shoe 143 is connected to the clutch drum 133. Thus, the electric motor output shaft 127 is directly connected to the driven shaft 11 through the centrifugal clutch 136.

In addition, numerical reference number 147 shown in FIG. 7, and FIG. 8 represent sealing members preferably made of rubber.

According to the third embodiment, the user can selectively install either one of the engine 117 and the electric motor 118 on the operation arm 10 with the preparation of both the engine 117 and the electric motor 118 as attachments to a bush cutting machine. That is, the bush cutting machine can be used with an engine drive type and a motor drive type on the basis of the working environment. For example, the engine 117 would be used as the power source in working environment where silence is not required. On the other hands, the electric motor 118 would be used as the power source in the working environment where silence is required. That is, the user can select either the engine 117 or the electric motor 118 as the power source based on the working environment. When the electric motor of a battery type is used as the power source, the bush cutting machine can be used even if there is no electric outlet. Furthermore, in this invention, the battery is formed as removable so that the charging the battery and the changing the battery can be easily operated.

Furthermore, when the operational arm 10 is released from the engine 117 or electric motor 118 as the power source, the clutch drum 133 and clutch shoe 135, 143 forming the centrifugal clutch 136, 144 are exposed outside. Thus, maintenance and replacement operation for clutch shoe 135, 143 of the centrifugal clutch 136, 144 can be conducted easily.

Moreover, in a preferred embodiment, the clutch drum is fixed to the driven shaft, while the clutch shoe is installed to the engine or the electric motor. With this arrangement, the force for pushing the clutch shoe to the clutch drum, or the coefficient of friction of clutch shoe as opposed to clutch drum can be set to a different value between the engine and electric motor without changing the clutch shoe.

Also a preferred embodiment, in the present invention, the centrifugal clutch is used for transmitting the drive power from the power source to the cutter. When the rotational speed of the electric motor is decreased due to a tangle of a grass between cutting head and cover, the engagement of the clutch shoe with the clutch drum is released. As a result the excess current is prevented from being supplied to the electric motor.

In addition, even if the user has purchased the bush cutting machine comprising the operation arm 10 and one of the power sources (the engine or the electric motor) as a set, the bush cutting machine can be changed to the other power source by purchasing the electric motor 118, additionally.

The present invention is not limited by the above-described preferred embodiments, it can be changed in various ways in the range that does not deviate from the subject matter. For example, this invention can be applied to such the direct acting type bush cutting machine, or such the bush cutting machine that the power source and the cutter are installed on a carriage.

Furthermore, the fastening member is not limited to the structure disclosed in this specification. Of course, the fastening structure disclosed in the first embodiment can be applied to the third embodiment of the bush cutting machine. The centrifugal clutch is also not limited to the structure disclosed in each of embodiments.

The disclosure of Japanese Application No. 2004-301988 filed on Oct. 15, 2004, and Japanese Application No. 2005-136495 filed on May 9, 2005 including the specification, drawing and abstract are incorporated herein by references in its entirety.

What is claimed is:

1. A bush cutting machine comprising:
   a main body;
   a driven shaft rotatably supported in the main body and having two opposite ends;
   a cutter member operatively connected to one end of the driven shaft;
   a power source selectively composed of an engine or an electric motor, having an output shaft;
   joint means for detachably and selectively connecting the main body and the power source, wherein said joint means provides for selectable user interchange amongst the engine and the electric motor depending on an intended use environment;
   a centrifugal clutch having a clutch drum operatively connected to the other end of the driven shaft and a clutch shoe operatively connected to the output shaft of the power source;
   wherein, when the power source is coupled to the main body by the joint means, the clutch drum and the clutch shoe are combined, for each of the engine and the electric motor usages, to form the centrifugal clutch for the transmission of a drive power generated by the power source to the cutter member through the drive shaft, and a transmission pathway of the drive power is drivingly disengaged between the clutch drum and the clutch shoe upon release of said joint means and detachment of the main body and the power source.

2. The bush cutting machine according to claim 1, wherein the clutch shoe is forced on an inner surface of the clutch drum by a centrifugal force.

3. The bush cutting machine according to claim 1, wherein the centrifugal clutch includes a rotor plate fixed to the output shaft of the power source, the clutch shoe rotatably supported on the rotor plate and an extension spring applying the spring force to the clutch shoe so as to leave the clutch shoe from the clutch drum,
   whereby when the rotational speed of the output shaft of the power source increases, the centrifugal force moves the clutch shoe toward the clutch drum against the spring force of the extension spring to place the centrifugal clutch in an engaged state.

4. The bush cutting machine according to claim 1, wherein the clutch shoe is incorporated in the power source, such that said clutch shoe is exposed to the outside of the power source upon detachment of the main body and the power source.

5. The bush cutting machine according to claim 1, wherein the clutch shoe is incorporated in the electric motor that is selected as the power source, and said clutch shoe is exposed to the outside of the electric motor upon detachment of the main body and the electric motor.

6. A bush cutting machine kit, comprising:
a main body;
a driven shaft rotatably supported in the main body and having two opposite ends;
an engine having an engine output shaft and a first clutch shoe operatively connected to the engine output shaft;
an electric motor having a motor output shaft and a second clutch shoe operatively connected to the motor output shaft;
a joint connector detachably and selectively connecting the main body to the engine or the electric motor, wherein said joint connector provides for selectable user interchange amongst the engine and the electric motor depending on an intended use environment;
a clutch drum connected to one of said ends of the driven shaft;
wherein when either the engine or the electric motor is coupled to the main body by the joint connector, the clutch drum is combined with a respective one of the first clutch shoe and the second clutch shoe to be coupled to form a centrifugal clutch for the transmission of a drive power generated by the power source to the cutter member through the driven shaft.

7. The bush cutting machine according to claim 6, wherein one of the first clutch shoe and the second clutch shoe is forced on an inner surface of the clutch drum by a centrifugal force.

8. The bush cutting machine according to claim 6, wherein the engine includes a first rotor plate fixed to the engine output shaft, the first clutch shoe rotatably supported on the first rotor plate and a first extension spring applying the spring force to the first clutch shoe so as to bias the first clutch shoe from the clutch drum, and the electric motor includes a second rotor plate fixed to the motor output shaft, the second clutch shoe rotatably supported on the second rotor plate and a second extension spring applying the spring force to the second clutch shoe so as to bias the second clutch shoe from the clutch drum,
whereby when the rotational speed of the engine output shaft or the motor output shaft increases, the centrifugal force moves a respective one of said first and second clutch shoes toward the clutch drum against the spring force of a respective one of the first and second extension springs to place the centrifugal clutch in an engaged state.

9. The bush cutting machine according to claim 6, wherein a respective one of the first clutch shoe and the second clutch shoe is exposed to the outside of a respective one of the engine and the electric motor upon detachment of the main body and the respective engine or the electric motor.

10. A bush cutting machine comprising:
a main body;
a driven shaft rotatably supported in the main body and having two opposite ends;
a cutter member operatively connected to one end of the driven shaft;
a power source selectively composed of an engine or an electric motor, having an output shaft;
a joint connector that detachably and selectively connects the main body and the power source, wherein said joint connector provides for selectable user interchange amongst the engine and the electric motor depending on an intended use environment;
a clutch having a clutch drum connected to the other end of the driven shaft and a clutch shoe connected to the output shaft of the power source;
wherein when the power source is coupled to the main body by the joint connector, the clutch drum and the clutch shoe are operationally combined, for each of the engine and the electric motor usages, to form the clutch for the transmission of a drive power generated by the power source to the cutter member through the drive shaft, and the clutch drum and the clutch shoe are exposed to the outside of the main body and the power source upon release of the joint connector and detachment of the main body and the power source.

11. The bush cutting machine according to claim 10, wherein the clutch shoe is forced on an inner surface of the clutch drum by a centrifugal force.

12. The bush cutting machine according to claim 10, wherein the clutch includes a rotor plate fixed to the output shaft of the power source, the clutch shoe rotatably supported on the rotor plate and an extension spring applying the spring force to the clutch shoe so as to bias the clutch shoe from the clutch drum,
whereby when the rotational speed of the output shaft of the power source increases, the centrifugal force moves the clutch shoe toward the clutch drum against the spring force of the extension spring to place the clutch in an engaged state.

13. The bush cutting machine of claim 1, wherein said power source is the electric motor and said clutch shoe is incorporated in said electric motor as an exposed end portion out from which extends said output shaft of the electric motor in exposed fashion.

14. The bush cutting machine of claim 1, wherein said clutch shoe is supported at the end portion of said electric motor in exposed fashion.

15. The bush cutting machine of claim 1, wherein said joint means comprises an exposed flange portion and a plurality of bolt and bolt hole combinations which are associated with said plate and are positioned peripherally around the clutch.

16. The bush cutting machine of claim 10, wherein said power source is the electric motor and said clutch shoe is incorporated in said electric motor as an exposed end portion out from which extends said motor output shaft in exposed fashion.

17. The bush cutting machine of claim 1, wherein said clutch shoe is supported at the end portion of said electric motor in exposed fashion.

18. The bush cutting machine of claim 10, wherein said joint connector comprises an exposed flange portion and a plurality of bolt and bolt hole combinations which are associated with said flange portion and are positioned peripherally around the clutch.

19. The bush cutting machine according to claim 1, wherein said joint means is arranged such that separation of the clutch components upon release of the joint means is achieved simultaneous with detachment of the main body and the power source.

20. The bush cutting machine according to claim 1, wherein said joint means includes an arm side joint case and a power source side joint case, and said clutch drum is arranged inside said joint means such that a cross-section through said joint means, that is transverse to an axis of rotation of said clutch shoe, extends through said clutch drum.

21. The bush cutting machine of claim 1, wherein said clutch drum is incorporated inside said joint means.

* * * * *